United States Patent
Goodworth et al.

(10) Patent No.: US 8,043,458 B2
(45) Date of Patent: Oct. 25, 2011

(54) METHOD OF FORMING PANELS USING AN IN-SITU TAPE PLACEMENT PROCESS AND PANELS FORMED THEREFROM

(75) Inventors: Alan R. Goodworth, Oxford, CT (US); James A. Anthony, Fort Worth, TX (US); William V. Forster, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 919 days.

(21) Appl. No.: 11/962,238

(22) Filed: Dec. 21, 2007

(65) Prior Publication Data

US 2010/0266820 A1 Oct. 21, 2010

Related U.S. Application Data

(60) Provisional application No. 60/936,597, filed on Jun. 21, 2007.

(51) Int. Cl.
 *B65H 81/00* (2006.01)
 *B32B 37/00* (2006.01)
(52) U.S. Cl. ........ 156/192; 156/175; 156/173; 156/189; 156/191; 156/193
(58) Field of Classification Search .................. 156/173, 156/175, 189, 191, 192, 193
 See application file for complete search history.

(56) References Cited

U.S. PATENT DOCUMENTS

| | | | |
|---|---|---|---|
| 3,687,795 A * | 8/1972 | Elkin ............................. 428/222 |
| 4,593,870 A | 6/1986 | Cronkhite et al. |
| 4,698,011 A * | 10/1987 | Lamalle et al. ............... 425/389 |
| 4,717,330 A * | 1/1988 | Sarh .............................. 425/403 |
| 5,451,015 A | 9/1995 | Cronkhite et al. |
| 6,138,949 A | 10/2000 | Manende et al. |
| 6,190,484 B1 * | 2/2001 | Appa ............................ 156/189 |
| 6,427,945 B1 | 8/2002 | Bansemir |
| 6,513,756 B1 | 2/2003 | Lambiaso |
| 6,554,225 B1 | 4/2003 | Anast et al. |
| 6,613,258 B1 * | 9/2003 | Maison et al. ................ 264/102 |
| 6,843,525 B2 | 1/2005 | Preisler |
| 6,959,894 B2 | 11/2005 | Hayashi |
| 7,063,763 B2 * | 6/2006 | Chapman, Jr. ................ 156/175 |
| 7,100,885 B2 | 9/2006 | Zerner |
| 7,124,982 B2 | 10/2006 | Brofeldt |
| 7,134,629 B2 | 11/2006 | Johnson et al. |
| 7,459,048 B2 * | 12/2008 | Pham et al. ................... 156/173 |
| 2004/0048022 A1 * | 3/2004 | Pratt ........................... 428/36.91 |
| 2006/0060705 A1 | 3/2006 | Stulc et al. |

FOREIGN PATENT DOCUMENTS

JP 2001293738 10/2001

(Continued)

OTHER PUBLICATIONS

International Search report and written opinion mailed Sep. 23, 2008.

(Continued)

*Primary Examiner* — Jeff Aftergut
(74) *Attorney, Agent, or Firm* — Carlson Gaskey & Olds, P.C.

(57) ABSTRACT

A composite panel and method of manufacture includes a support structure and a tape skin wound about the support structure. A mandrel assembly with extractable longitudinal mandrels facilitates winding of the tape skin onto the support structure. The composite panel is suitable for use in an aircraft floor system.

23 Claims, 10 Drawing Sheets

FOREIGN PATENT DOCUMENTS

JP    2005022246    1/2005

OTHER PUBLICATIONS

X. Zhang, L. Hounslow, M. Grassi, "Improvement of Low-Velocity Impact and Compression-After-Impact Performance by Z-Fibre Pinning," Composites Science and Technology, 66 92006); 2785-2794.

A. Marasco, D. Cartie, I. Patridge, A. Rezai, "Mechanical Properties Balance in Novel Z-pinned Sandwich Panels: out-of-plane properties," Composites Part A—revision Mar. 2005.

A. Marasco, D. Cartie, I. Partridge, "Mechanical Properties Balance in Novel Z-pinned Sandwich Panels: Out-of-plane share," CompTest 2004, Bristol, Sep. 21-23, 2004.

* cited by examiner

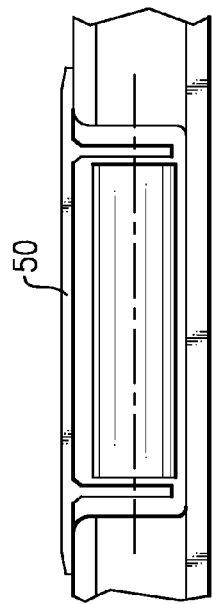
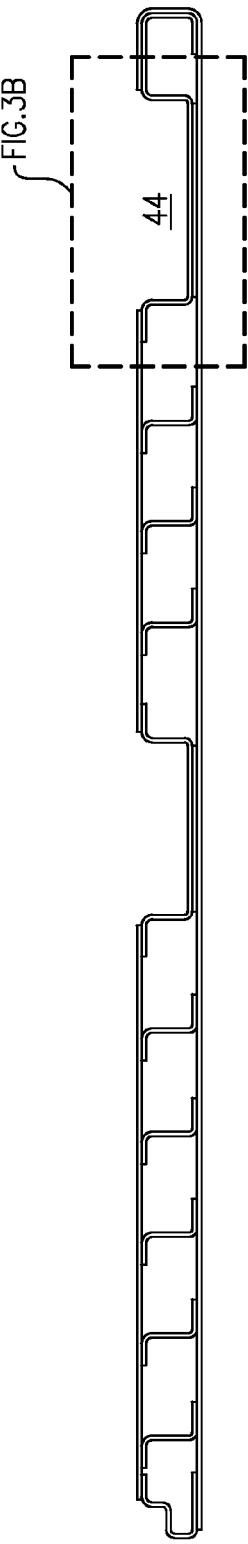
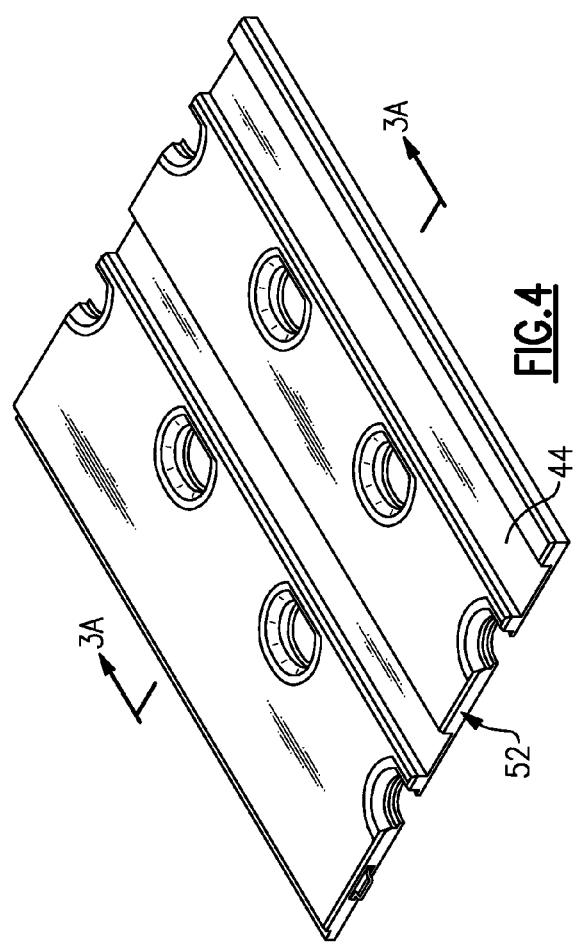

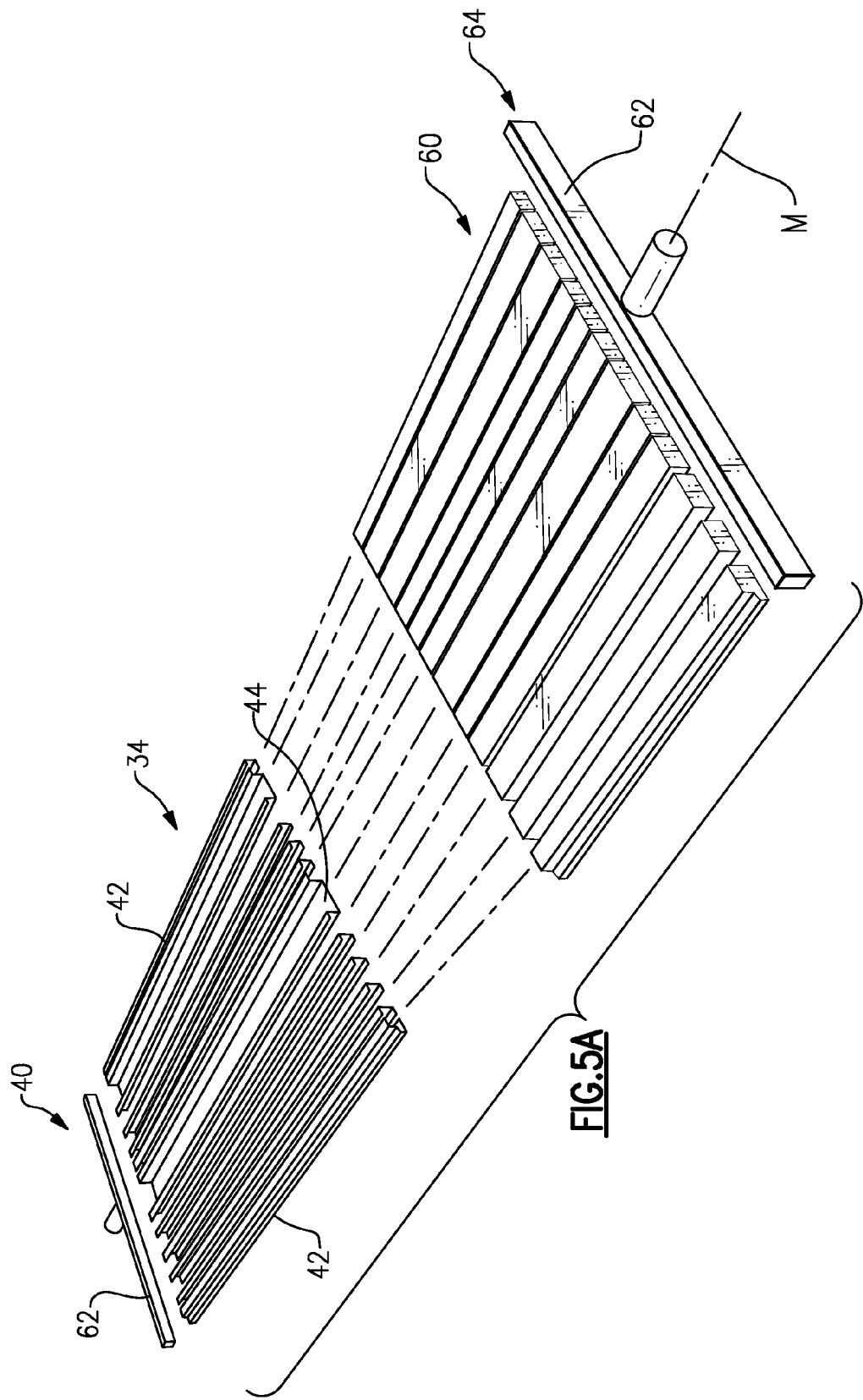

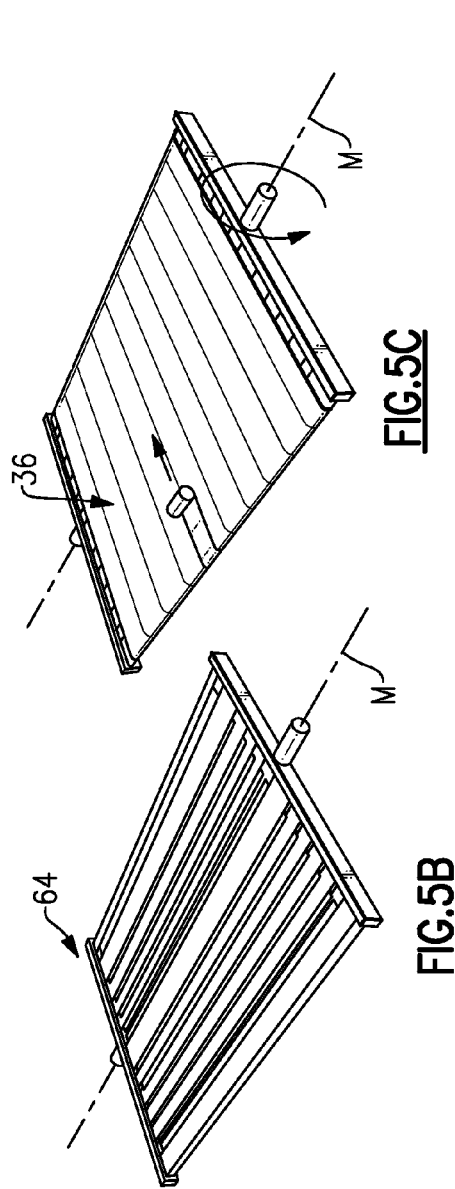
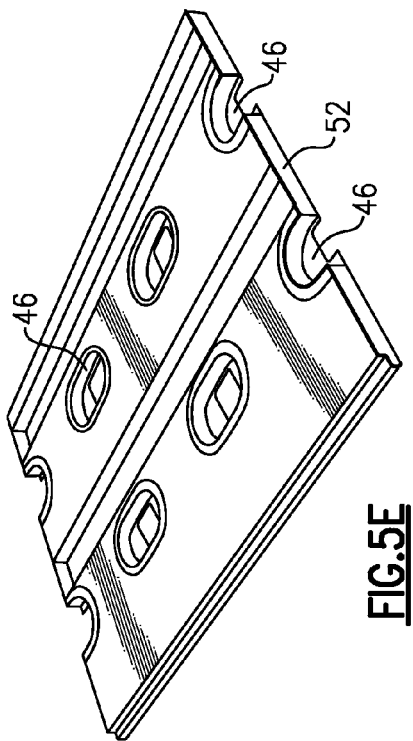
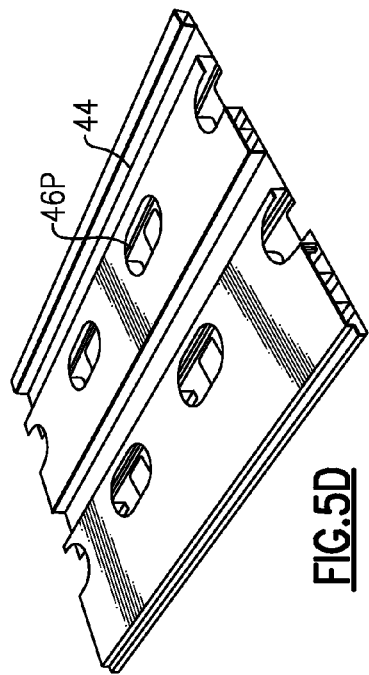
FIG.5B
FIG.5C
FIG.5D
FIG.5E

METHOD OF FORMING PANELS USING AN IN-SITU TAPE PLACEMENT PROCESS AND PANELS FORMED THEREFROM

The present application claims priority to U.S. Provisional Patent Application Ser. No. 60/936,597, filed Jun. 21, 2007.

This invention was made with government support under Contract No.: DAHH10-03-2-0003, awarded by the Department of Army. The government therefore has certain rights in this invention.

BACKGROUND OF THE INVENTION

The present invention relates to composite structures, and more particularly to composite panels and methods for making such panels.

Current aircraft floor systems incorporate thin metallic or composite prepreg skin materials adhesively bonded to either a metallic or non-metallic honeycomb core. Current metallic aircraft floor systems require minimal tooling and have high tolerances, but may not achieve the weight benefits of composite floor systems.

Current aircraft composite floor system floor panels utilize a honeycomb core material with pre-cured fiberglass or prepreg composite skins bonded thereto in a large heated press or autoclave. Local hard points and edge closeouts are typically accomplished with an epoxy potting compound. The floor panels may require relatively complicated and labor intensive process steps including: pre-curing of the inboard and outboard skins; cutting, machining, and forming of the honeycomb core; local densification of the honeycomb core at attachment hard points and edge closeouts; preparation of the skins and core assembly for bonding; assembly of the pre-cured skins, lay-up of film adhesive layers for bonding; curing of the assembled skins, adhesive, and core; secondary machining, densification, and splicing operations of the honeycomb core material; and multiple processing cycles in an autoclave, oven or press, to complete fabrication of an individual panel.

Although composite floor systems are generally lighter in weight than metallic floor systems, composite floor systems may be more expensive and labor intensive to manufacture.

Moreover, usage of honeycomb core structures in rotary-wing aircraft floor systems may suffer inherent moisture absorption due to the open cell structure. Such moisture absorption may result in increased weight and a resultant performance degradation over a prolonged service period.

Accordingly, it is desirable to provide panels suitable for use in an aircraft floor system that are lighter in weight and manufactured in fewer steps relative to current panels, yet meet or exceed design requirements therefor.

SUMMARY OF THE INVENTION

A composite panel suitable for use in an aircraft floor system according to an exemplary aspect of the present invention includes a support structure; and a tape skin wound about the support structure.

A method of manufacture of a composite panel according to an exemplary aspect of the present invention includes assembling a support structure with a multiple of longitudinal mandrels; assembling a mandrel assembly with the multiple of longitudinal mandrels to retain the support structure and define an axis of rotation; winding a tape about the assembled mandrel assembly while the mandrel assembly is rotated about the axis of rotation to bond the tape to the support structure and form a tape skin onto the support structure to thereby form a composite panel; and disassembling the mandrel assembly from the composite panel.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 3 is a sectional view of a floor panel with a reversible roller assembly;

FIG. 4 is a perspective view of the floor panel;

FIGS. 5A-5G illustrate steps of the in-situ tape placement manufacturing process according to the present invention;

DETAILED DESCRIPTION OF THE DISCLOSED EMBODIMENT

Figure 1A:
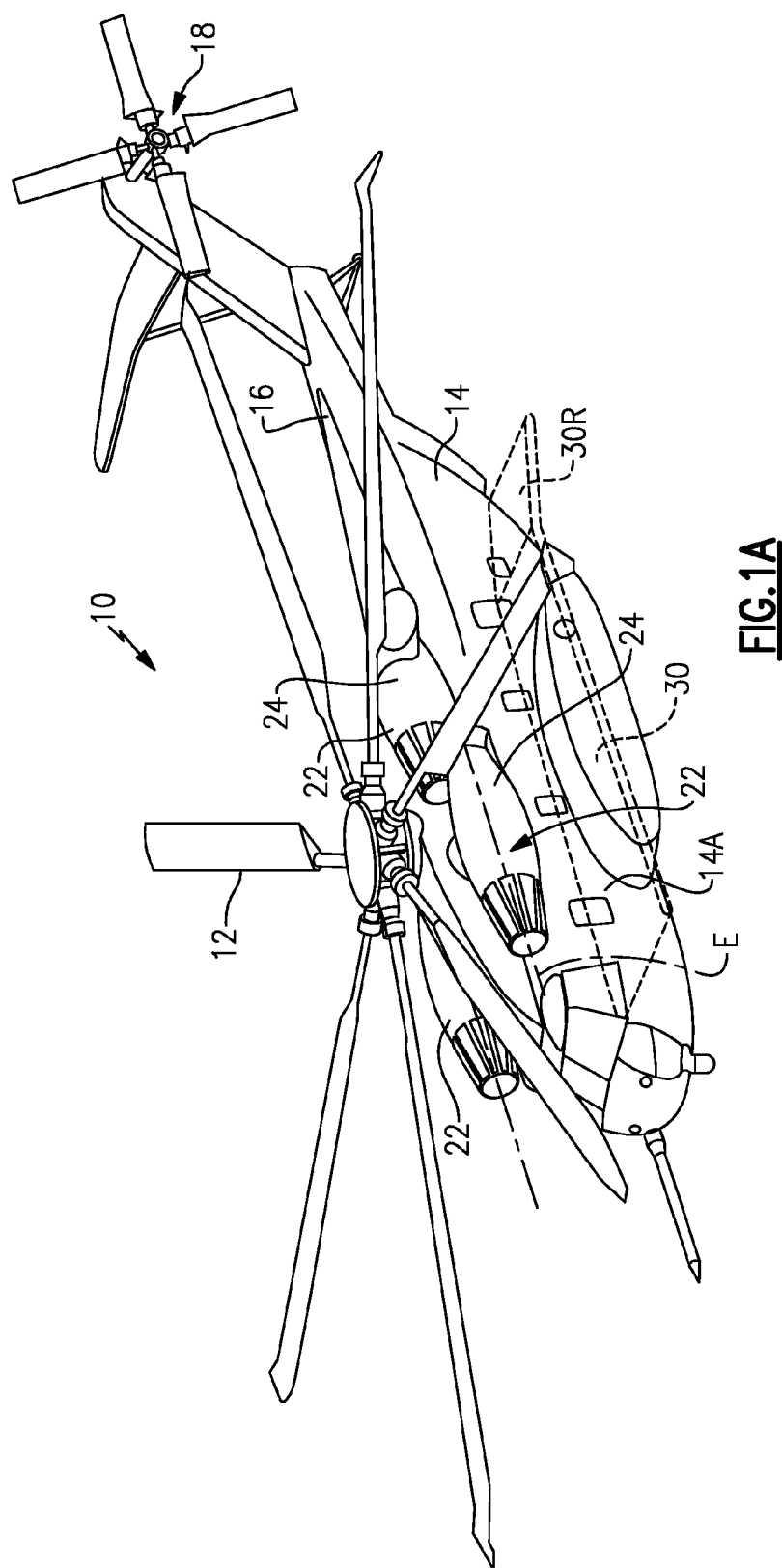
FIG. 1A is a schematic perspective view of a rotary-wing aircraft for use with the present invention.

FIG. 1A schematically illustrates a rotary-wing aircraft 10 having a main rotor system 12. The aircraft 10 includes an airframe 14 having an extending tail 16 which mounts a tail rotor system 18, such as an anti-torque system. The airframe 14 includes an airframe section 14A. The main rotor assembly 12 is driven about an axis of rotation through a main gearbox by one or more engines 22. The main rotor system 12 includes a multiple of rotor blades mounted to a rotor hub. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

An airframe cabin section 14A, includes a cabin floor system 30 (FIG. 1B) and a ramp section 30R (FIG. 1C), which may include, inter alia, a multitude of frame members 24 and a multitude of beam members 26 which support an aircraft outer skin 28 and the cabin floor system 30 formed of a multiple of composite floor panels 32. It should be understood that although a composite floor panel 32 is illustrated in many of the figures herein, it should be understood that numerous structures with various features (FIG. 1B) may be manufactured in accordance with the present invention. The multitude of frame members 24 and beam members 26 may be arranged in a generally rectilinear pattern, however, any arrangement may be used with the present invention.

Figure 2:
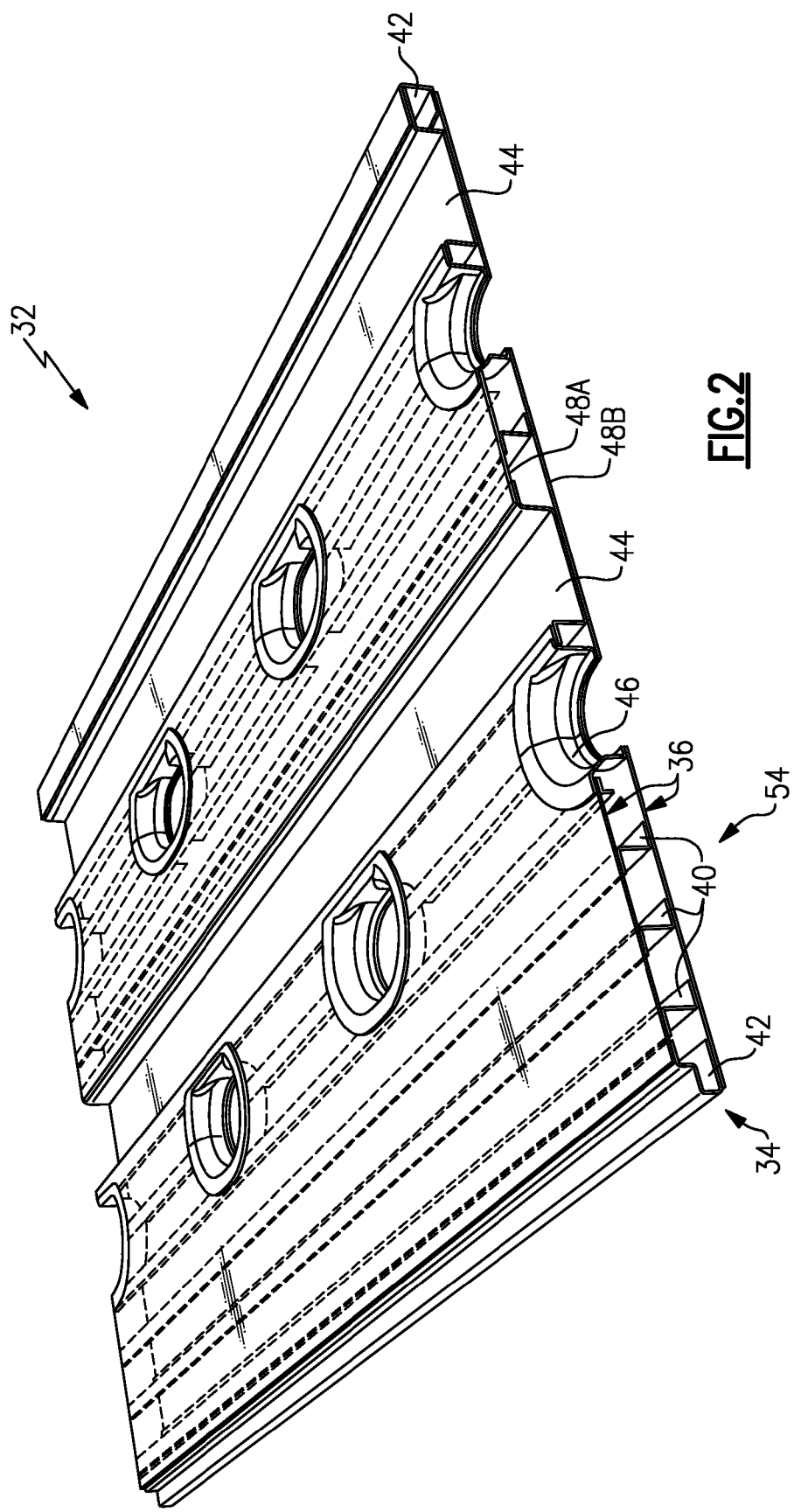
FIG. 2 is a schematic partially phantom view of one floor panel of the floor system of FIGS. 1B and 1C.

Referring to FIG. 2, each composite floor panel 32 generally includes a support structure 34 about which is wound a tape 36 and bonds thereto in an in-situ tape placement process. The support structure 34 includes a multiple of stiffeners 40, a multiple edge stiffeners 42, a multiple of roller trough stiffeners 44, and a multiple of tie-down pans 46. The support structure 34 may be manufactured from non-metallic material, metallic materials or various combinations thereof. The support structure section 34 may be manufactured from a thermoplastic composite matrix material including, but not limited to, PEEK, PEKK, Ultem, PPS, Urethane, Nylon, PEI, PES, PEK, as well as in combination with other material enhancements such as nano-particulate inclusions. Furthermore, these materials may also contain fibers which include but are not limited to pan carbon, pitch carbon, s-fiberglass, e-fiberglass, quartz, LCP, M5, and ceramic.

The tape 36 defines a tape upper skin 48A, a tape lower skin 48B. The tape upper skin 48A and tape lower skin 48B is wound about the support structure 34 such that the in-situ tape upper skin 48A and in-situ tape lower skin 48B is essentially a continuous fiber reinforced thermoset and/or thermoplastic composite material (e.g., tow or slit tape) prior to a trimming operation (FIG. 5C) to yield a nearly fastener-less skin surface. That is, the trimming operation separates the contiguous wound tape skin into the tape upper skin 48A and tape lower skin 48B (FIG. 5C to FIG. 5D). The trimming operation also provides other feature openings such as the opening 46P for installation of each of the multiple of tie-down pans 46 (FIG. 5E).

The stiffeners 40 may be of various cross-sectional shapes. Although the cross-sectional shapes are illustrated as a "Z," shape they may include other cross-sectional configurations. Such other shapes may include but are not limited to "I", "L", "C", "J" etc.

Figure 1B:
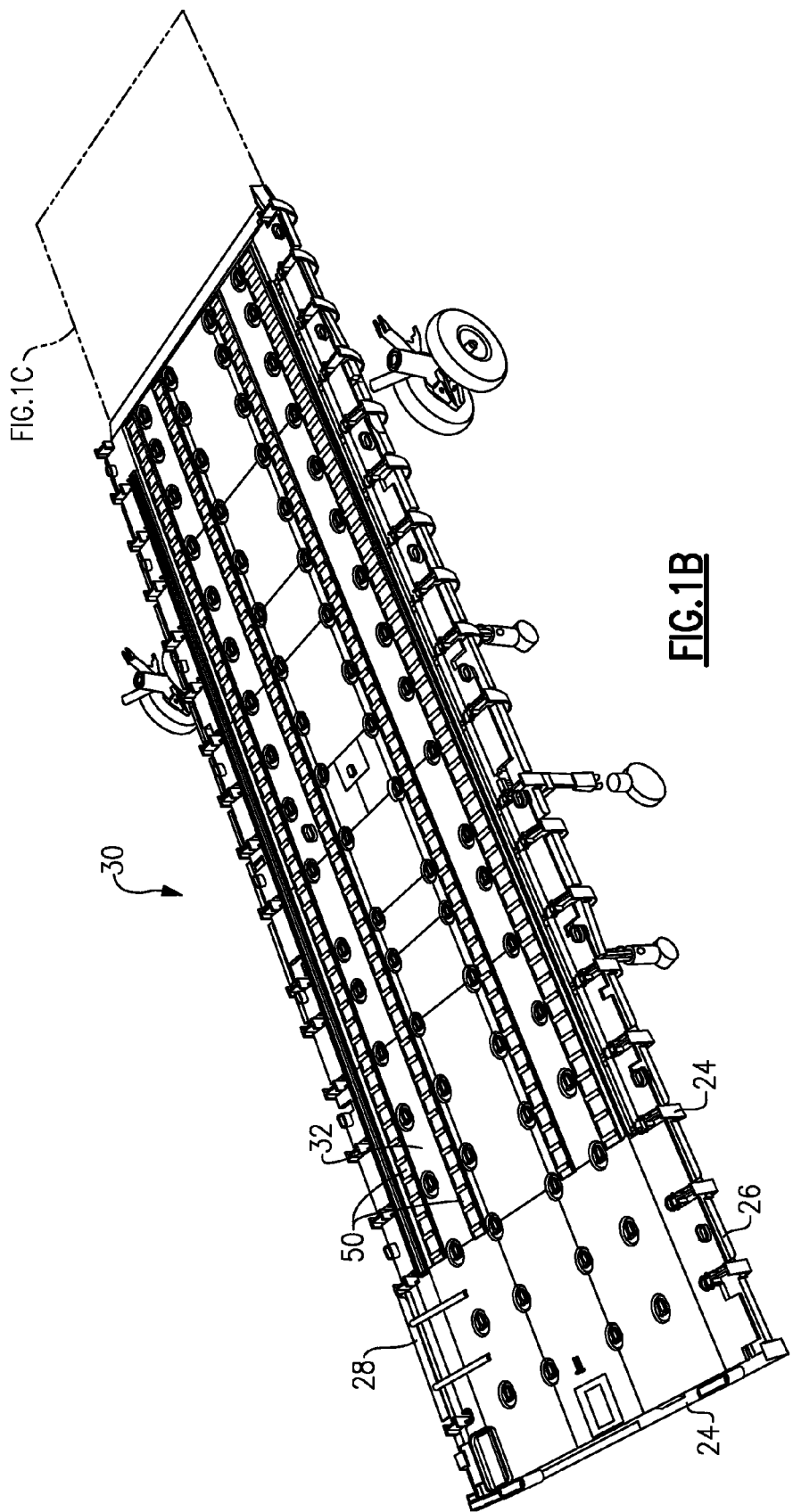
FIG. 1B is a general perspective view of a cabin cargo floor section of the rotary-wing aircraft of FIG. 1A

The edge stiffeners 42 are generally of a jogged or step-shape and are longitudinally arranged to facilitate attachment of each panel to an adjacent panel or other interface (FIG. 1B). Various seals, raised splice straps as well as bonded-on carbon spacers, "form-in-place gaskets" and such like may additionally be provided to provide a moisture seal interface.

Figure 1C:
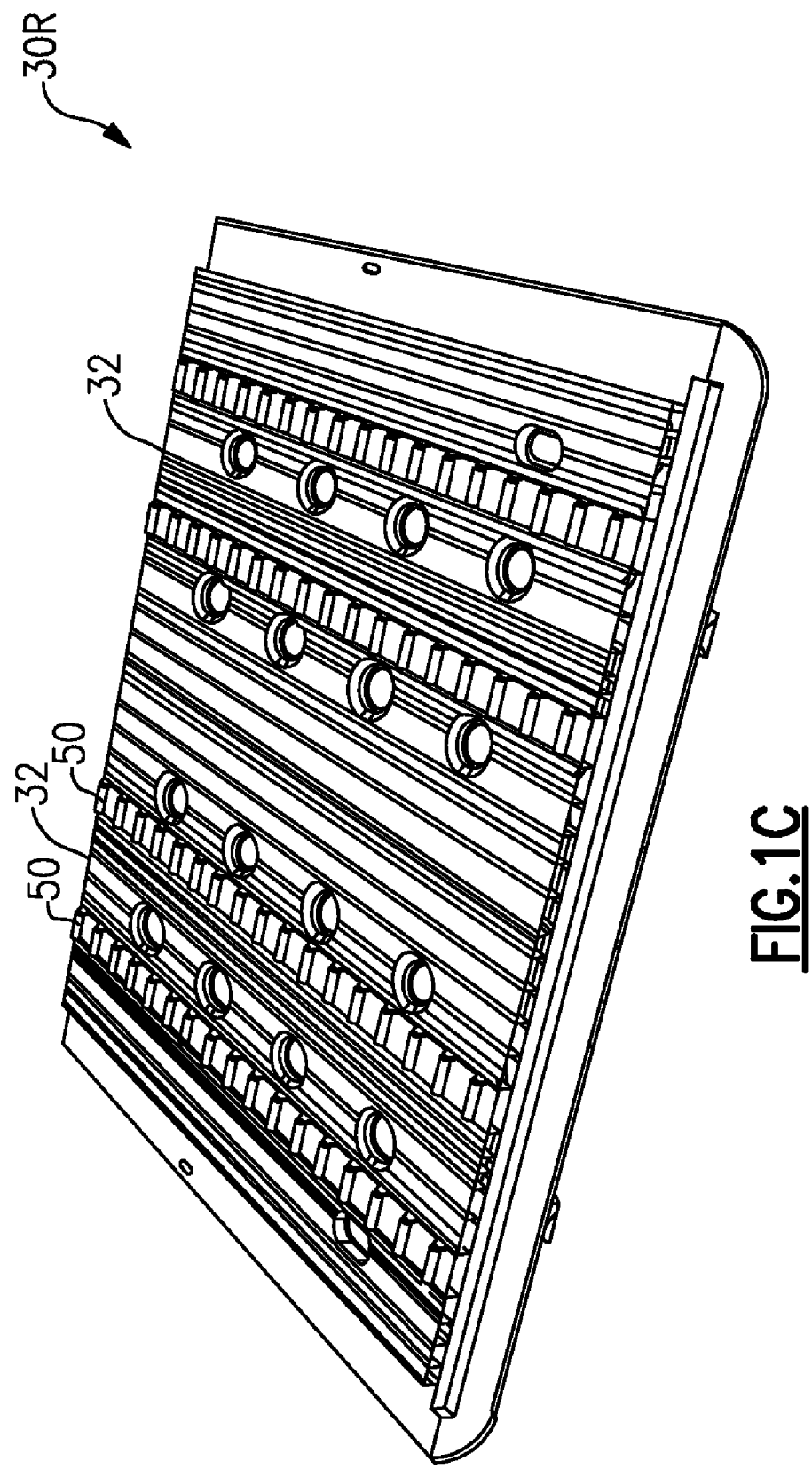
FIG. 1C is a general perspective view of a ramp floor system for use with the cargo floor section of FIG. 1B.

Each of the multiple of roller trough stiffeners 44 receive a reversible roller assembly 50 (FIGS. 1B, 1C and 3). Four rows of reversible roller assembly 50 are typical and include a locking feature which secures the reversible roller assembly 50 in both the "roller-up" and stowed positions. A typical composite floor panel 32 has two full length trough stiffeners 44 that receive the reversible roller assembly 50.

A multiple of end cap members 52 (FIG. 4) are arranged generally transverse to the stiffeners 40, 42, 44 to seal the composite floor panel 32. The end cap members 52 closes-off the lateral open end section 54 of the composite floor panel 32. The end cap members 52 double as transverse stiffeners to reinforce the open end sections 54 and may also include various stowable lifting handles. Various seals, raised splice straps as well as bonded-on carbon spacers, "form-in-place gaskets" and such like may additionally be provided in the end cap members 52 to provide a moisture seal interface.

Figure 5F:
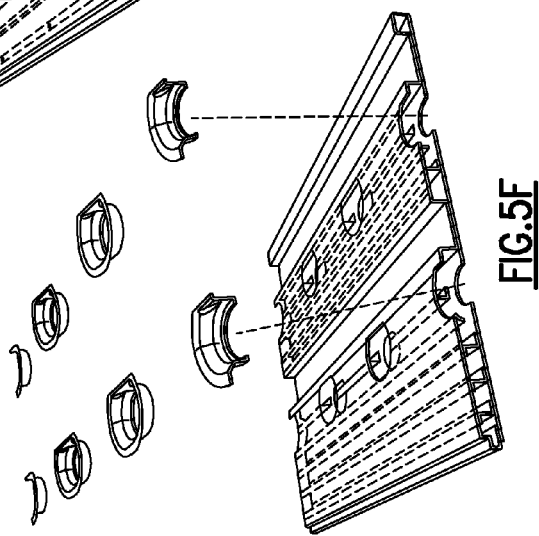
Figure 6:
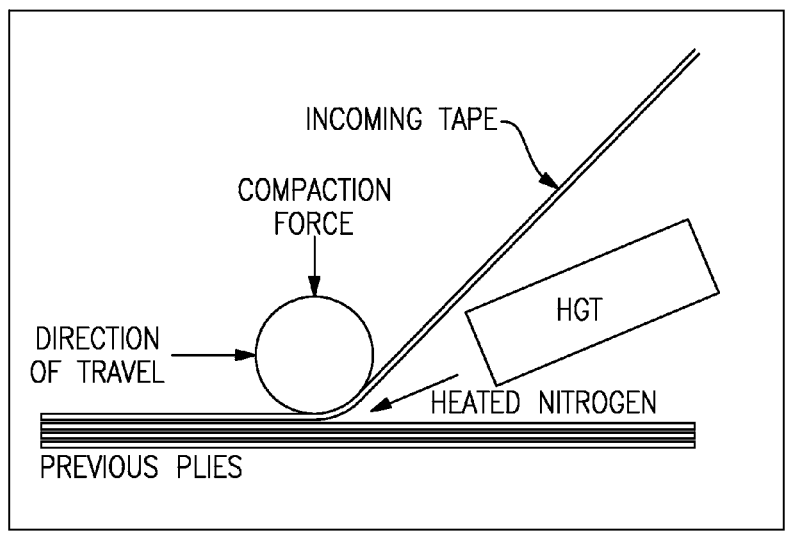
FIG. 6 is a schematic view of the fiber placement process.

FIGS. 5A-5E illustrates an exemplary embodiment of a manufacturing sequence for the composite floor panel 32 using an in-situ tape placement process (tape placement process schematically illustrated in FIG. 6).

Referring to FIG. 5A, a multiple of longitudinal mandrels 60 are assembled with the support structure 34. The longitudinal mandrels 60 may be of various shapes. The longitudinal mandrels 60 in one non-limiting embodiment are shaped to fill the void defined between: each of the multiple of stiffeners 40; the multiple edge stiffeners 42; within the multiple of roller trough stiffeners 44; and about an outer edge of the edge stiffeners 42 to provide a smoothed winding surface. That is, the longitudinal mandrels 60 fill voids in the support structure 34 so as to react the tape placement roller (FIG. 6).

A winding mandrel 62 is removably assembled transverse to the longitudinal mandrels 60 to form a mandrel assembly 64. The mandrel assembly 64 retains and positions the support structure 34 (FIG. 5B). Various mandrel assembly 64 structures may be utilized.

The mandrel assembly 64 defines an axis of rotation M (FIG. 5C) about which the mandrel assembly 64 is rotated to wind the tape skin 36. The wound tape 36 is applied through in-situ processing of thermoplastic tape or tow to successively "weld" one layer of tape such as IM7/PEEK tape at a time over the support structure 34 to yield a nearly fastener-less skin surface. The in-situ process joins one thermoplastic layer to another on the fly, to thereby minimize or eliminate autoclave preparation and subsequent post processing. One such in-situ process is that provided by ADC Acquisition Company, doing business as Automated Dynamics, of Schenectady, N.Y., USA. It should be understood that multiple plies or layers of thermoplastic tape or tow having various or no overlap may be applied to provide a desired rigidity as generally understood.

Referring to FIG. 5D, the mandrel assembly 64 is disassembled and the multiple of longitudinal mandrels 60 are longitudinally extracted from the support structure 34. That is, the longitudinal mandrels 60 slide out of the support structure subsequent to removal of the winding mandrel 62. The longitudinal open ended construction of the composite floor panel 32 facilitates removal of the longitudinal mandrels 60.

Once the mandrel assembly 64 is disassembled and the multiple of longitudinal mandrels 60 are extracted from the support structure 34, the wound tape 36 is trimmed. The wound tape 36 is trimmed to, for example, open the roller trough stiffeners 44 and provide an opening 46P for installation of each of the multiple of tie-down pans 46 (FIG. 5E). The wound tape skin 36 is also trimmed from the outer edge of the edge stiffeners 42 to essentially define the separate tape upper skin 48A and tape lower skin 48B which were heretofore contiguous.

Figure 5G:
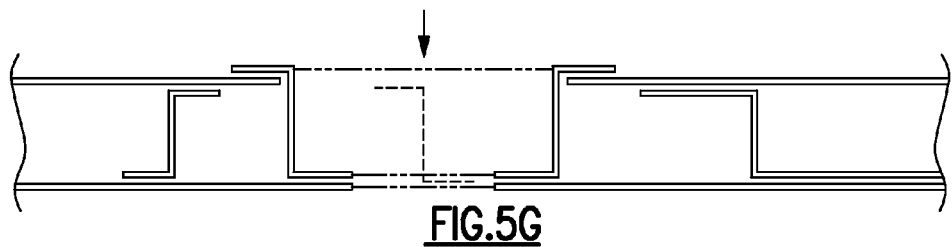

Referring to FIG. 5E, the multiple of end cap members 52 are arranged generally transverse to the stiffeners 40, 42, 44 to seal the composite floor panel 32. The end cap members 52 close-off the open end sections 54 of the composite floor panel 32. The multiple of tie-down pans 46 are also installed in each respective opening 46P (FIG. 5F). The multiple of tie-down pans 46 may be non-flush with the tape upper skin 48A (FIG. 5G). This secondary detail component installation arrangement facilitates extraction of the longitudinal mandrels 60 as potential trapped areas are eliminated were detail components earlier integrated into the composite floor panel 32. Detail components other than tie-down pans 46 such as floor mounted equipment and cargo hook doors may be readily incorporated into the composite floor panel 32 in a similar manner. The non-flush arrangement is lightweight and provides uncomplicated manufacturability.

The process eliminates fasteners; utilizes low cost thermoforming and tape placement process to build detail parts; provides the potential for low cost commodity parts; utilizes a tough resin which offers impact resistance; and utilizes thermoplastics which can be reconsolidated and reformed if required. The thermoplastic panel is superior in cost and impact strength to conventional thermoset composite sandwich panels with the potential to reduce weight by 25%, as compared with riveted or machined aluminum floors.

The method of manufacture also provides various options to achieve non-flush or flush component integration.

Figure 7:
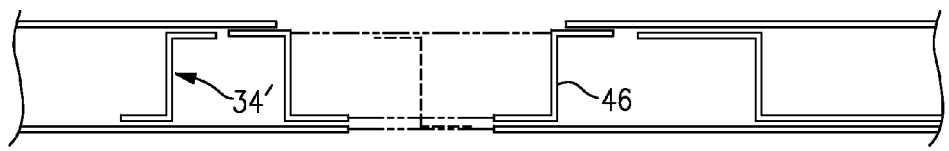
FIG. 7 is a sectional view of one embodiment of a flush tie-down pan installation.

Referring to FIG. 7, another non-limiting embodiment facilitates flush mounting of the multiple of tie-down pans 46. The tie-down pans 46 are installed from a lower surface such that the tie-down pans 46 are flush with an upper surface of the support structure 34'. The lower skin 48B is then bonded to the support structure 34 with a secondary bond subsequent to mandrel removal.

Figure 8:
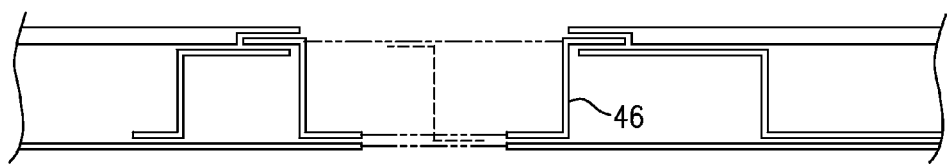
FIG. 8 is a sectional view of another embodiment of a flush tie-down pan installation.

Referring to FIG. 8, another non-limiting embodiment facilitates flush mounting the multiple of tie-down pans 46 by "joggling" the tape upper skin 48A during winding. That is, the tape upper skin 48A is shifted vertically or "jogged" so as to accommodate each of the multiple of tie-down pans 46. The tape upper skin 48A provides a step-like shape adjacent each tie-down pain 46. Alternatively, a lesser number of layers or plies may be provided in the localized area.

Figure 9A:
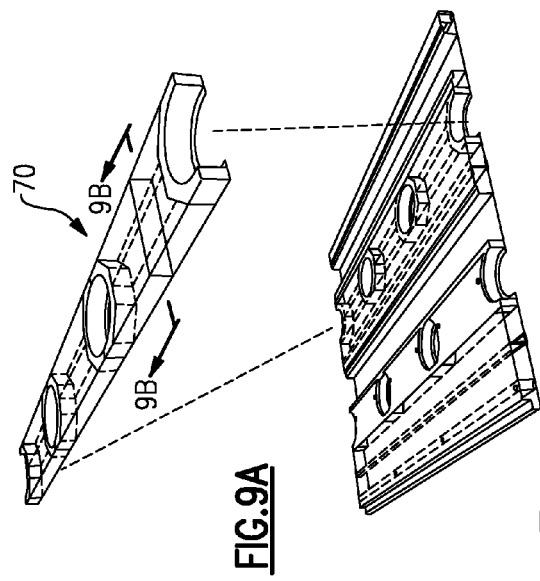
FIG. 9A is an exploded view of a tube and block tie-down row subassembly installation.
Figure 9B:
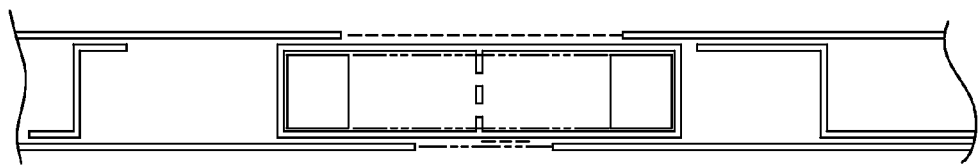
FIG. 9B is a sectional view through the tube and block tie-down row subassembly illustrated in FIG. 9A.

Referring to FIG. 9A, another embodiment facilitates flush mounting the multiple of tie-down pans 46 as the pans 46 are incorporated within a tube and block subassembly 70. The subassembly 70 reacts the tape placement roller pressure (FIG. 6) and essentially replaces a longitudinal mandrel at that location. That is, the tube and block subassembly 70 (FIG. 9B) is essentially a longitudinal support which replaces individual tie-down pans to facilitate winding of the tape 36 thereon.

Figure 10A:
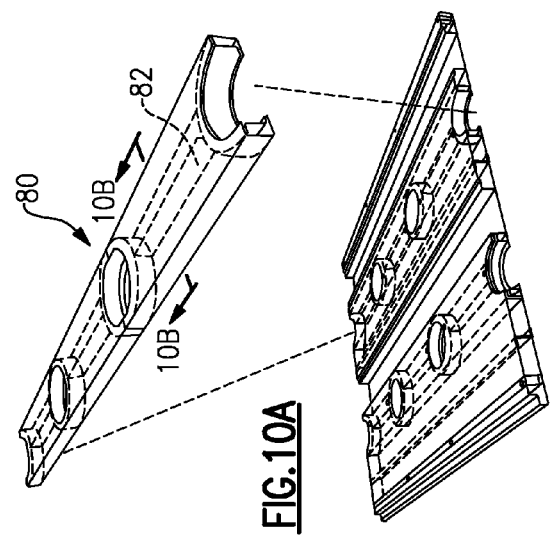
FIG. 10A is an exploded view of a tube and pan tie-down row subassembly installation.
Figure 10B:
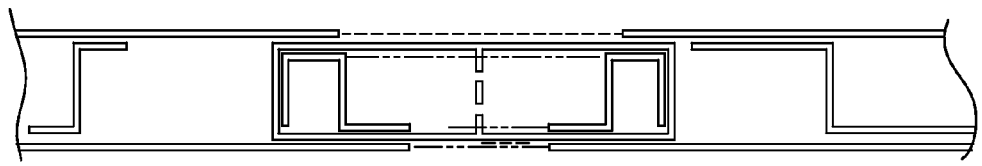
FIG. 10B is a sectional view through the tube and pan tie-down row subassembly illustrated in FIG. 10A.

Referring to FIG. 10A, another embodiment facilitates flush mounting of the multiple of tie-down pans 46 with a tube and pan subassembly 80. The tube and pan subassembly 80 is generally as the above tube and block subassembly 70 with a lighter weight open structure (FIG. 10B). The open structure includes transverse supports 82 which are relatively closely spaced to support the tape placement roller pressure (FIG. 6).

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of manufacturing a composite panel comprising:
   (A) arranging a support structure having a multiple of stiffeners with a multiple of longitudinal mandrels such that each of the multiple of stiffeners are spaced from an adjacent one of the multiple of stiffeners by at least one of the multiple of longitudinal mandrels;
   (B) assembling a winding mandrel transverse to the multiple of longitudinal mandrels to provide a mandrel assembly and define an axis of rotation;
   (C) rotating the mandrel assembly about the axis of rotation to wind and bond a tape to the multiple of stiffeners to form a tape skin onto the support structure to thereby form a composite panel; and
   (D) disassembling the mandrel assembly from the composite panel;
   (E) trimming the composite panel tape skin to form a tape upper skin and a tape lower skin;
   (F) mounting an end cap member configured to close an open end section of the composite panel transverse to said support structure, the end cap member in contact with the tape upper skin and the tape lower skin.

2. A method as recited in claim 1, wherein said step (A) further comprises:
   (a) assembling at least one of the multiple of longitudinal mandrels into a void defined by at least one of the multiple of stiffeners.

3. A method as recited in claim 1, wherein said step (A) further comprises:
   (a) axially assembling at least one of the multiple of longitudinal mandrels into the support structure.

4. A method as recited in claim 1, wherein said step (A) further comprises:
   (a) assembling at least one of the multiple of longitudinal mandrels within a void defined by a roller trough stiffener.

5. A method as recited in claim 1, wherein said step (D) further comprises:
   (a) extracting the multiple of longitudinal mandrels out of the composite panel in a longitudinal direction.

6. A method as recited in claim 1, wherein said step (D) further comprises:
   (a) axially sliding the multiple of longitudinal mandrels out of the composite panel generally parallel to the support structure.

7. A method as recited in claim 1, further comprising:
   (a) trimming a tie-down pan opening; and
   (b) trimming an opening defined by a roller trough stiffener.

8. A method as recited in claim 7, further comprising:
   (c) mounting a tie down pan into the tie-down pan opening; and
   (d) mounting an end cap member configured to close an open end section of the composite panel transverse to said support structure, the end cap member in contact with the tape upper skin and the tape lower skin.

9. A method as recited in claim 1, wherein said step (C) further comprises:
   winding the tape to form the tape skin onto the support structure generally transverse to the multiple of stiffeners.

10. A method as recited in claim 1, further comprising:
    assembling each of the multiple of longitudinal mandrels at least partially into at least one of the multiple of stiffeners.

11. A method as recited in claim 1, further comprising:
    trimming a tie-down pan opening.

12. A method as recited in claim 11, further comprising:
    mounting a tie down pan into the tie-down pan opening.

13. A method as recited in claim 1, further comprising:
    arranging an edge stiffener as at least one end of the multiple of stiffeners, the edge stiffener defining a step-shape.

14. A method as recited in claim 1, further comprising:
alternating each of the multiple of stiffeners with each of the multiple of longitudinal mandrels.

15. A method as recited in claim 1, further comprising:
separating each of the multiple of stiffeners one from another with one of the multiple of longitudinal mandrels.

16. A method as recited in claim 1, further comprising:
spacing each of the multiple of stiffeners from each other with one of the multiple of longitudinal mandrels.

17. A method of manufacturing a composite panel comprising:
assembling a mandrel assembly with a multiple of longitudinal mandrels to retain a support structure and define an axis of rotation;
winding a tape about the assembled mandrel assembly while the mandrel assembly is rotated about the axis of rotation to bond the tape with the support structure to apply a tape skin on the support structure to thereby form a composite panel;
disassembling the mandrel assembly from the composite panel;
trimming the tape skin to form a tape upper skin and a tape lower skin; and
mounting an end cap member configured to close an open end section of the composite panel transverse to the support structure, the end cap member in contact with the tape upper skin and the tape lower skin.

18. A method as recited in claim 17, wherein each of a multiple of stiffeners of said support structure are spaced from an adjacent one of the multiple of stiffeners by at least one of the multiple of longitudinal mandrels.

19. A method as recited in claim 17, further comprising:
alternating each of a multiple of stiffeners of said support structure with each of the multiple of longitudinal mandrels.

20. A method as recited in claim 17, further comprising:
separating each of a multiple of stiffeners of said support structure one from another with one of the multiple of longitudinal mandrels.

21. A method as recited in claim 17, further comprising:
spacing each of a multiple of stiffeners of said support structure from each other with one of the multiple of longitudinal mandrels.

22. A method of manufacturing a composite panel comprising:
assembling a mandrel assembly with a multiple of longitudinal mandrels to retain a support structure and define an axis of rotation;
winding a tape about the assembled mandrel assembly while the mandrel assembly is rotated about the axis of rotation to bond the tape with the support structure to form a tape skin onto the support structure to thereby form a composite panel; and
disassembling the mandrel assembly from the composite panel;
trimming the tape skin to form a tape upper skin and a tape lower skin;
trimming a tie-down pan opening;
mounting a tie down pan into the tie-down pan opening; and
mounting an end cap member configured to close an open end section of the composite panel transverse to said support structure, the end cap member in contact with the tape upper skin and the tape lower skin.

23. A method of manufacturing a composite panel comprising;
(A) arranging a support structure having a multiple of stiffeners with a multiple of longitudinal mandrels such that each of the multiple of stiffeners are spaced from an adjacent one of the multiple of stiffeners by at least one of the multiple of longitudinal mandrels;
(B) assembling a winding mandrel transverse to the multiple of longitudinal mandrels to provide a mandrel assembly and define an axis of rotation;
(C) rotating the mandrel assembly about the axis of rotation to wind and bond a tape to the multiple of stiffeners to form a tape skin onto the support structure to thereby form a composite panel; and
(D) disassembling the mandrel assembly from the composite panel;
(E) trimming the composite panel tape skin to form a tape upper skin and a tape lower skin;
(F) trimming a roller trough stiffener opening; and
(G) mounting a reversible roller assembly into the roller trough stiffener opening.

* * * * *